United States Patent
Butcher (10) Patent No.: US 11,341,108 B2
(45) Date of Patent: May 24, 2022

(54) SYSTEM AND METHOD FOR DATA DEDUPLICATION IN A SMART DATA ACCELERATOR INTERFACE DEVICE

(71) Applicant: DELL PRODUCTS, LP, Round Rock, TX (US)

(72) Inventor: Andrew Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/075,498

(22) Filed: Oct. 20, 2020

(65) Prior Publication Data

US 2022/0121634 A1 Apr. 21, 2022

(51) Int. Cl.
| | |
|---|---|
| G06F 16/00 | (2019.01) |
| G06F 16/215 | (2019.01) |
| G06F 16/22 | (2019.01) |
| G06F 16/174 | (2019.01) |
| G06F 16/2455 | (2019.01) |
| G06F 3/06 | (2006.01) |

(52) U.S. Cl.
CPC ........ *G06F 16/215* (2019.01); *G06F 16/1748* (2019.01); *G06F 16/2255* (2019.01); *G06F 16/24556* (2019.01); *G06F 3/0641* (2013.01)

(58) Field of Classification Search
CPC .............. G06F 16/1748; G06F 16/215; G06F 16/2255; G06F 16/24556; G06F 3/0641
See application file for complete search history.

(56) References Cited

U.S. PATENT DOCUMENTS

| | | | |
|---|---|---|---|
| 9,298,726 B1* | 3/2016 | Mondal | G06F 3/0608 |
| 10,540,327 B2 | 1/2020 | Ngo et al. | |
| 10,706,082 B1 | 7/2020 | Barrell et al. | |
| 2011/0307447 A1* | 12/2011 | Sabaa | G06F 16/24556 |
| | | | 707/637 |
| 2011/0307659 A1* | 12/2011 | Hans | G06F 3/0613 |
| | | | 711/114 |
| 2017/0115889 A1* | 4/2017 | Chen | G06F 3/0683 |
| 2017/0364414 A1* | 12/2017 | Pogosyan | G06F 16/9027 |
| 2019/0155927 A1* | 5/2019 | Nagao | G06F 16/9535 |
| 2020/0304289 A1* | 9/2020 | Androulaki | G06F 21/64 |

* cited by examiner

*Primary Examiner* — Diedra McQuitery
(74) *Attorney, Agent, or Firm* — Larson Newman, LLP (57) ABSTRACT

A hardware accelerator device detects duplicate data blocks independently from a processor of an information handling system. The device includes an interface, a hash function, a bloom filter, and a data comparator. The interface receives data blocks. The hash function determines a hash of a received data block. The bloom filter includes comparison hashes, each associated with a comparison data block. The bloom filter determines if the hash matches a comparison hash. The data comparator directs the interface to receive the comparison block when the hash matches the comparison hash, and compares the received data block with the comparison data block to determine if they are identical. The device stores a pointer when the data comparison block determines that the blocks are identical.

20 Claims, 6 Drawing Sheets

SYSTEM AND METHOD FOR DATA DEDUPLICATION IN A SMART DATA ACCELERATOR INTERFACE DEVICE

FIELD OF THE DISCLOSURE

This disclosure generally relates to information handling systems, and more particularly relates to data deduplication in a Smart Data Accelerator Interface (SDXI) device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A hardware accelerator device may detect duplicate data blocks independently from a processor of an information handling system. The device may include an interface, a hash function, a bloom filter, and a data comparator. The interface may receive data blocks. The hash function may determine a hash of a received data block. The bloom filter may include comparison hashes, each associated with a comparison data block. The bloom filter may determine if the hash matches a comparison hash. The data comparator may direct the interface to receive the comparison block when the hash matches the comparison hash, and may compare the received data block with the comparison data block to determine if they are identical. The device may store a pointer when the data comparison block determines that the blocks are identical.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
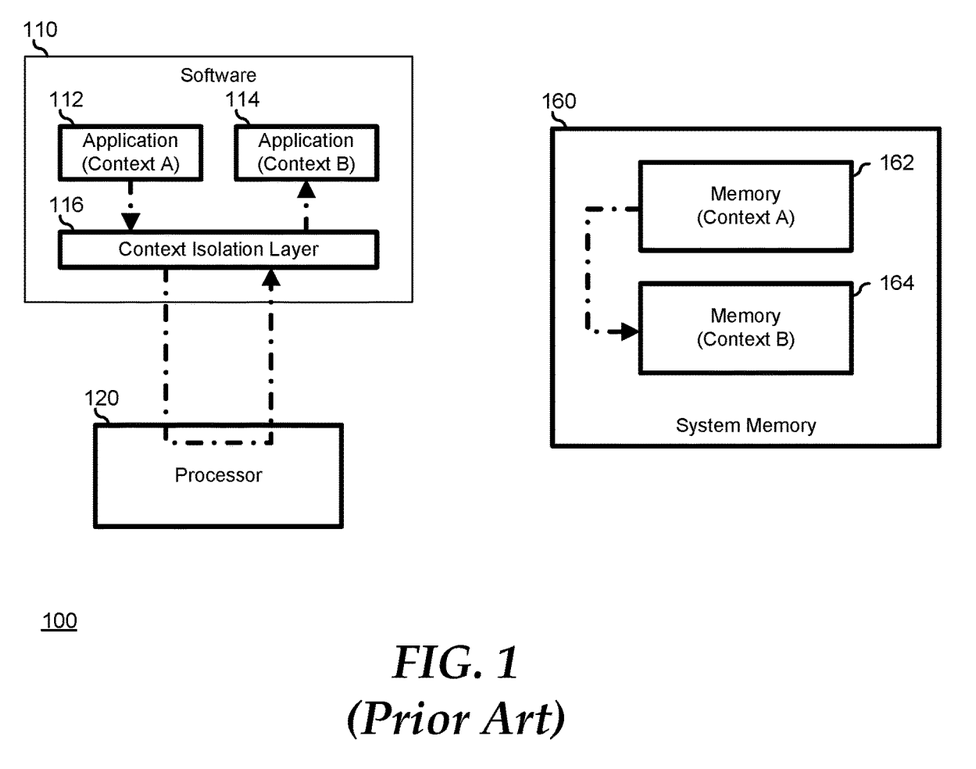
FIG. 1 is a block diagram of an information handling system according to the prior art.

FIG. 1 illustrates an information handling system 100 that utilizes a data exchange architecture in accordance with the prior art. Information handling system 100 includes software 110, a processor 120, and a system memory 160. Software 110 represents machine-executable code stored on information handling system 100 that is executable by processor 120, and includes a first application 112 that is associated with a first context, a second application 114 that is associated with a second context, and a context isolation layer 116. Application 112 is associated with one or more address ranges in the system physical address space (SPA) provided by system memory 160. The address ranges associated with application 112 are collectively shown as a portion 162 of system memory 160. Similarly, application 114 is associated with one or more address ranges in system memory 160, collectively shown as a portion 164 of the system memory. Context isolation layer 116 represents one or more agent, application program interface (API), utility, or the like that operates to maintain the isolation between memory 162 and 164. Examples of context isolation layer 116 may include a system Basic Input/Output System (BIOS) or Universal Extensible Firmware Interface (UEFI), hereinafter referred to collectively as "BIOS," that operates to provide isolated memory ranges for system operations, a virtual desktop system that isolates various memory ranges for the use of multiple users of the virtual desktop system, a hypervisor or virtual machine manager (VMM) that sets up and maintains virtual machines and their associated memory ranges, or the like.

In operation, when applications 112 and 114 are instantiated on information handling system 100, context isolation layer 116 allocates memory 162 and 164 to the use of their respective applications. In addition, when applications 112 and 114 need to interact, for example by moving data from one application to the other, context isolation layer 116 operates to manage the transfer of data between memory 162 and 164.

Note here that the data exchange architecture of information handling system 100 requires the execution of code associated with context isolation layer 116 by processor 120 in order to perform data transfers between memory 162 and memory 164. As such, the prior art data exchange architecture imposes a processing burden on processor 120, thereby reducing the processor cycles available for performing other tasks associated with applications 112 and 114. It will be understood that this processing overhead may be partially mitigated by the inclusion of Direct Memory Access (DMA) hardware in information handling system 100. However, it will be further understood that such DMA hardware is typically a vendor specific add-on, and access to such DMA hardware by applications 112 and 114 directly is typically difficult. In particular, even with the inclusion of DMA hardware, processor 120 is still needed to set up DMA transfers, and context isolation layer 116 is still needed in its role as gatekeeper to system memory 160.

Figure 2:
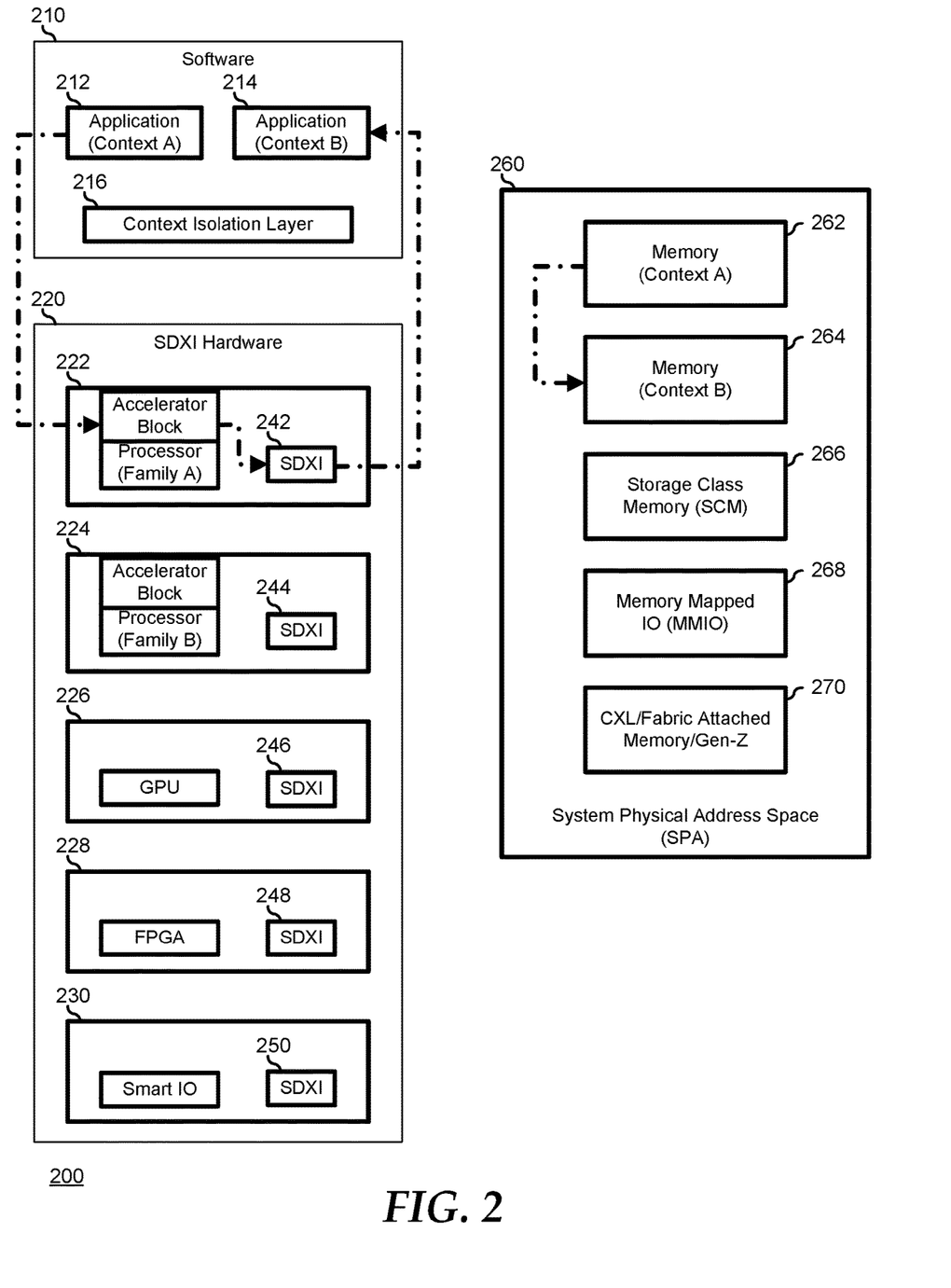
FIG. 2 is a block diagram of an information handling system according to an embodiment of the current disclosure.

FIG. 2 illustrates an information handling system 200 that utilizes a Smart Data Accelerator Interface (SDXI) data exchange architecture in accordance with an embodiment of the current disclosure. Information handling system 200 includes software 210, SDXI hardware 220, and a system physical address space (SPA) 260. SDXI hardware 220 includes a first family of processors 222 and an associated SDXI interface 242, a second family of processors 224 and an associated SDXI interface 244, one or more Graphics Processor Unit (GPU) 226 and an associated SDXI interface 246, a Field-Programmable Gate Array (FPGA) 248 and an associated SDXI interface 248, and a Smart I/O device 230 and an associated SDXI interface 250. Software 210 is similar to software 110, and represents machine-executable code stored on information handling system 200 that is executable by a processor such as one or more of processors 222 and 224. Software 210 includes a first application 212 that is associated with a first context, a second application 214 that is associated with a second context, and a context isolation layer 216. Software 210 may include functions and features similar to software 110, as described above. In particular, software 210 may implement the data exchange architecture of information handling system 100, as needed or desired. As such, application 212 is associated with one or more address ranges in SPA 260, with the associated address ranges shown as a portion 262 of the SPA, and application 214 is associated with one or more address ranges in the SPA, with the associated address ranges shown as a portion 264 in the SPA. Here too, context isolation layer 216 is similar to context isolation layer 116, representing one or more agent, API, utility, or the like that operates to maintain the isolation between memory 262 and 264. As such, context isolation layer 216 operates to allocate memory 262 and memory 264 when respective application 212 and application 214 are instantiated on information handling system 200, and the context isolation layer prevents the use of various memory ranges by unauthorized applications.

The SDXI data exchange architecture represents an industry effort to expand and standardize data movement protocols and hardware accelerator interfaces. As such, information handling system 200 broadens the scope of data exchanges on both the hardware side and the memory side. In particular, on the hardware side, SDXI hardware 220 incorporates various types of processing elements, co-processors, accelerators, and other data movers, as typified by processor families 222 and 224, GPU 226, FPGA 228, and Smart I/O device 230. On the memory side, SPA 260 is expanded to include not only the system physical memory, as typified by memory 262 and memory 264, but also separately attached memory, such as Storage Class Memory (SCM) devices 266, memory mapped I/O (MMIO) devices 268, and memory architectures, such as Compute Express Link (CXL) and Gen-Z memory interfaces, fabric-attached memory, and the like, as shown collectively as memory device 270. In particular, the SDXI data exchange architecture treats all of memory devices 262, 264, 266, 268, and 270 as a single SPA 260. The SDXI data exchange architecture then provides standardized interfaces for data movement between software 210, SDXI hardware 220, and SPA 260. Here, SDXI interfaces 242, 244, 246, 248, and 250 represent hardware and software associated with their respective hardware devices, such that a common set of SDXI commands, instructions, procedures, calls, and the like, referred to hereinafter as "SDXI commands," can be made to the hardware devices. Here, the details of implementing the various SDXI commands can be left to the design requirements and desires of the various hardware manufacturers. In this way, the SDXI data exchange architecture remains extensible and forward-compatible with new hardware or memory developments, and is independent of actual data movement details, data acceleration implementations, and the underlying I/O interconnect technology. The SDXI commands support: data movement between different address spaces including user address spaces located within different virtual machines; data movement without mediation by privileged software once a connection has been established; an interface and architecture that can be abstracted or virtualized by privileged software to allow greater compatibility of workloads or virtual machines across different servers; a well-defined capability to quiesce, suspend, and resume the architectural state of a per-address-space data mover to allow "live" workload or virtual machine migration between servers; mechanisms to enable forwards and backwards compatibility across future specification revisions, allowing software and hardware designed to different specification revisions to interoperate; the ability to incorporate additional offloads in the future leveraging the architectural interface; and a concurrent DMA model. As used herein, SDXI will be understood to represent any present or future specifications, specification revisions, articles, working papers, or other publications of the Smart Data Accelerator Interface (SDXI) Technical Working Group (TWG) of the Storage Networking Industry Association (SNIA).

Figure 3:
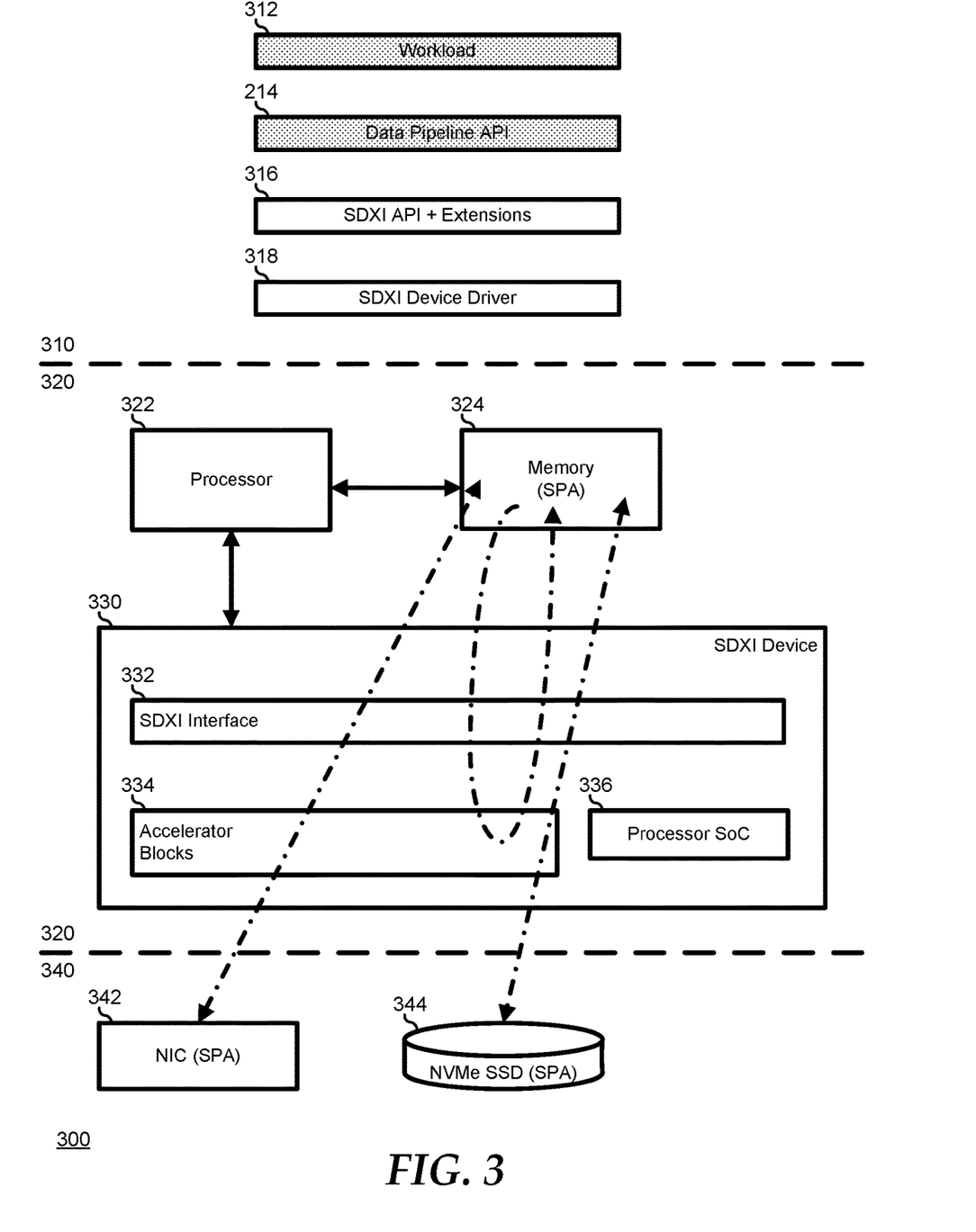
FIG. 3 is a block diagram of an information handling system according to another embodiment of the current disclosure.

FIG. 3 illustrates an embodiment of an information handling system 300 similar to information handling system 200. Information handling system 300 includes a software layer 310, a hardware layer 320, and an attachment layer 340. Software layer 310 is similar to software 210, and includes a workload 312, a data pipeline API 314, a SDXI API 316, and a SDXI hardware driver 318. Hardware layer 320 includes a processor 322, a memory (SPA) 324, and a SDXI hardware device 330. Attachment layer 340 includes a Network Interface Card (NIC) 342 and a Non-Volatile Memory-Express (NVMe) Solid State Drive (SSD) 344. NIC 342 and SSD 344 are each extensions of the SPA space of information handling system 300.

Workload 312 and data pipeline API 314 operate similarly to applications 212 and 214, and context isolation layer 216, and represent elements of a typical information handling system that perform the processing task of the information handling system. In particular, workload 312 operates to perform various operations on data and to move data between different storage and processing elements of information handling system 300, and may make various service calls to data pipeline API to assist in such processing operations and data moves. SDXI API 316 represents an API configured to provide the core operability as specified by a particular revision of an SDXI specification. In addition, SDXI API 316 provides additional extensions to the core operability of the particular SDXI specification, as described below. When workload 312 or data pipeline API 314 invoke SDXI API 316 for the various data operations or data moves, the SDXI API operates to direct SDXI hardware driver 318 elicit SDXI hardware 330 to perform one or more of the invoked operations or data moves, as needed or desired. In this regard, SDXI hardware driver 318 and SDXI hardware 330 are closely associated with each other.

As such, SDXI hardware 330 represents a wide variety of different types of hardware that can be utilized to perform the SDXI core operations and extensions as described herein. An example of SDXI hardware 330 may include accelerator blocks within a general purpose processor or processor family, such as a CPU or the like, a purpose specific processor, such as a GPU or the like, a logic-based device or state-based device, such as a FPGA, a Complex Programmable Logic Device (CPLD) or the like, a smart I/O device that provides in-line data processing in the course of I/O operations, such as a smart NIC, a Host Bus Adapter (HBA), a storage controller such as a RAID controller, a Network Attached Storage (NAS) device, a Storage Area Network (SAN) controller, or the like, or another processing device, as needed or desired. Here, it will be understood that, SDXI hardware 330 may be configured to provide operations consistent with its type, but that are not specifically associated with its SDXI functionality. For example, where SDXI hardware 330 represents a FPGA type of device, it will be understood that the FPGA device may be invoked to provide functionality of a more general nature, in addition to the SDXI functionality as described herein.

SDXI hardware 330 includes a SDXI interface 332, various accelerator blocks 334, and a processor SoC 336. Accelerator blocks 334 may represent hardware accelerators, logic-based or state-based accelerators, or other configurable or pre-configured accelerator functions, as needed or desired. As described further below, SDXI hardware 330 may operate in some embodiments to provide enhanced data pipelining operations. For example, SDXI hardware 330 may provide data movement: between different locations in memory 324, to and from the memory and a network connected to NIC 342, to and from the memory and NVMe SSD 344, to and from the network and the NVMe SSD, and between different locations in the NVME SSD. SDXI hardware 330 may further operate in some embodiments to provide enhanced data transformation operations on data, either as atomic operations or in conjunction with the data movement utilizing various accelerator blocks 334. In particular, various embodiments of SDXI hardware 330 may provide: data compression/decompression, data encryption/decryption, data checksums, hash functions such as SHA-256 hashes and the like, RAID functions, erasure coding, and the like. Other functions that may be performed by SDXI hardware 330 may include data deduplication, LZ-4 compression, compression ratio and block size optimization, data operation chaining, multi-point data movement, uncompressible block handling, and query analytics.

Figure 4:
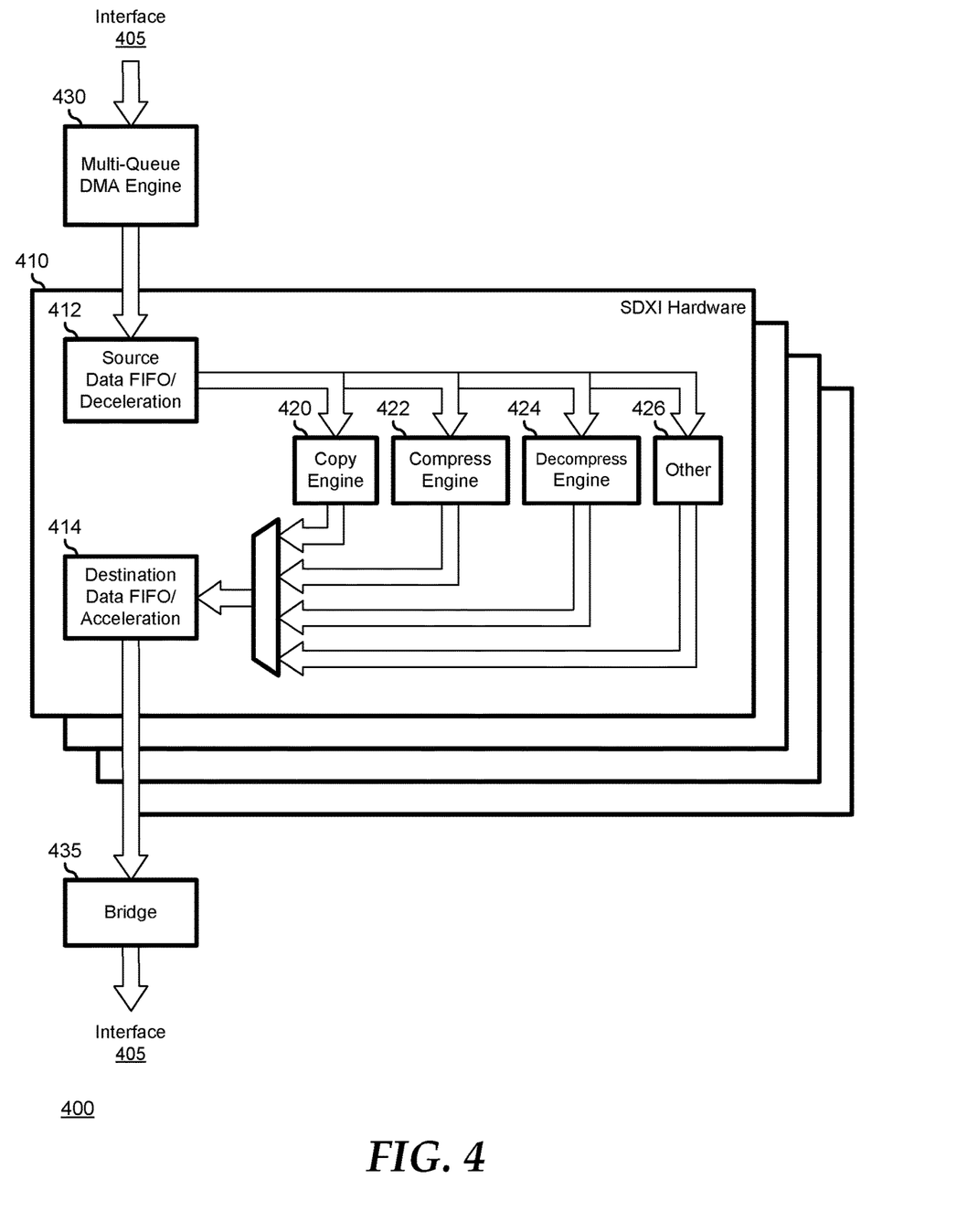
FIG. 4 is a block diagram of an information handling system according to another embodiment of the current disclosure.

FIG. 4 illustrates an embodiment of an information handling system 400 similar to information handling systems 200 and 300. Information handling system 400 includes a processor complex (not illustrated) that provides a communication interface 405 to provide data communications with multiple SDXI hardware devices 410. An example of interface 405 may include a Third Generation Peripheral Component Interconnect-Express (PCIe Gen3) x16 (16-lane) communication link, a PCIe Gen3 communication link with greater or fewer lanes (e.g., x4, x8, x32), or another communication interface, as needed or desired. Information handling system 400 further includes a multi-queue Direct Memory Access (DMA) engine 430, and a data bridge 435. Each of the SDXI hardware devices 410 are connected to receive data and instructions from DMA engine 430, and to provide data and control information to data bridge 435. DMA engine 430 provides dynamic allocation of parallel data flows to the multiple SDXI hardware devices 410, as needed by the processing tasks operating on information handling system 400. The data flows are provided to DMA engine 430 via interface 405, and may be received from memory or storage devices within the SPA of information handling system 400. Data bridge 435 receives the data flows from SDXI hardware devices 410 and communicates the data flows via interface 405 to the memory and storage devices within the SPA of information handling system 400.

Each of the SDXI hardware devices 410 may be understood to be similar hardware devices, such as where the SDXI hardware devices are each provided by a common manufacturer and are a common device type. Here, DMA engine 430 may allocate data flows to the various SDXI hardware devices 410 based upon factors unrelated to the particular device type of the SDXI hardware devices. For example, DMA engine 430 may allocate data flows based upon the resource loading or availability of each of the SDXI hardware devices, the power level or power state of each of the SDXI hardware devices, or other factors not directly related to the type of the SDXI hardware devices, as needed or desired. Further, each of SDXI hardware devices 410 may be understood to be different hardware devices, such as where the SDXI hardware devices are provided by different manufacturers and are different device types. Here, DMA engine 430 may allocate data flows to the various SDXI hardware devices 410 based upon the type of each of the SDXI hardware devices. For example, where a particular SDXI hardware device 410 contains a network function, DMA engine 430 may allocate network based data flows to that particular SDXI function. On the other hand, where a different SDXI hardware device contains a storage controller function, DMA engine 430 may allocate storage based data flows to the other SDXI function.

SDXI hardware device 410 is illustrated as including a source data FIFO/deceleration module 412, a destination data FIFO/acceleration module 414, a copy engine 420, a compression engine 422, a decompression engine 424, and one or more additional engines 426. The configuration illustrated by SDXI hardware device 410 will be understood to be typical, and representative of a wide range of device configurations, as needed or desired. As such, the particular configuration illustrated by SDXI hardware device 410 should not be understood to be limiting on the type, nature, features, configuration, or functionality of SDXI hardware devices in general. Other functions that may be performed by SDXI hardware 410 may include data deduplication, LZ-4 compression, compression ratio and block size optimization, data operation chaining, multi-point data movement, uncompressible block handling, and query analytics.

Figure 5:
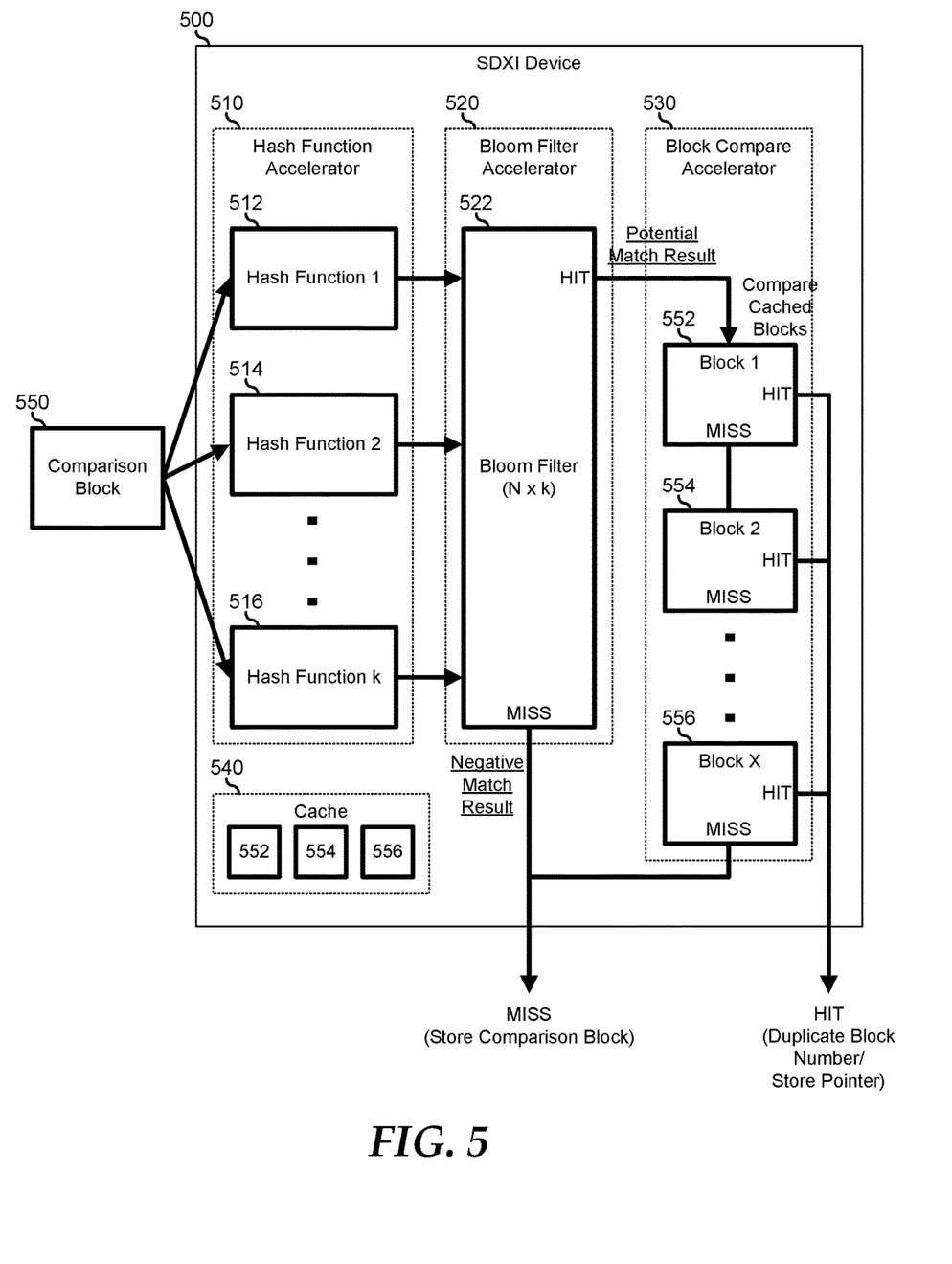
FIG. 5 is a block diagram of an SDXI device according to another embodiment of the current disclosure.

FIG. 5 illustrates a SDXI device 500 similar to SDXI 330. SDXI 500 includes accelerators 510, 520, and 530, and a cache memory device 540. It will be understood that SDXI device 500 may include other elements, such as a SDXI interface similar to SDXI interface 322, a processor SoC such as processor SoC 336, and other elements, as needed or desired. Accelerators 510, 520, and 530 may be understood to be hardware accelerators, logic-based or state-based accelerators, or other configurable or pre-configured accelerators, as needed or desired. For example, where SDXI device 500 represents a processor-based SDXI device such as a processor, a GPU, or the like, accelerators 510, 520, and 530 may represent code configured to perform the functions of the accelerators as described below. On the other hand, where SDXI device 500 represents a logic-based or state-based device such as a FPGA, a CPLD, or the like, accelerators 510, 520, and 530 may represent programmed logic or state arrays that are configured to perform the functions of the accelerators as described below.

The inventor of the present disclosure has understood that, in particular applications, such as in distributed storage arrays, the existence of duplicate blocks of data can consume significant storage space on storage arrays. However, the process of data deduplicaton, which reduces or eliminates the storing of identical blocks in a cluster as more than a single object, requires significant processing resources. In particular, data deduplication may be so compute intensive that such data deduplication is performed off line, when the storage media is otherwise less utilized, for example in off-peak processing hours. One method for data deduplication utilizes hash tables to quickly identify potential matches. However, even with the use of hash tables, the tables may become large and cumbersome to search, making in-line data deduplication difficult and excessively compute intensive.

In a particular embodiment, SDXI device 500 operates to identify if a data block is a duplicate of other data blocks that have previously been processed. For example, SDXI device 500 may determine whether a received data block has been previously stored on a distributed storage array or other storage device. More particularly, SDXI device 500 operates in-line and the data block is received. In-line data deduplication has the advantage that duplicate data blocks do not get stored or otherwise transferred. Thus, in the distributed storage array example, a duplicate block can be identified, and, rather than transferring the received block to the distributed storage array, the received block can be flagged as being identical to a previously stored block, and a pointer or flag in the previously stored block can be created to indicate different object names that are associated with the identified block.

Accelerator 510 includes hash functions 512, 514, and one or more additional hash function 516. When a comparison block 550 is received, the comparison block is loaded to each of hash functions 512, 514, and 516, and the hash functions each determine an algorithmic hash of the comparison block. An example hash function may include a hash function in the Secure Hash Algorithm 2 (SHA-2) suite of hash algorithms (e.g., SHA-224, SHA-256, SHA-384, SHA-512, SHA-512/224, SHA-512/256), a BLAKE hash algorithm (e.g., BLAKE2b, BLAKE2p, BLAKE2 bp, etc.), or another hash algorithm, as needed or desired. The results of the operations of hash functions 512, 514, and 516 on comparison block 550 are searched through accelerator 520 which consists of a Bloom filter 522. Here, it will be understood that a single hash value from, e.g., hash function 512 for comparison block 550 will either be found in Bloom filter 522, or not. If not, then comparison block 550 is definitively determined to have not been previously processed by SDXI device 500, and the Bloom filter provides a "MISS" indication that there was a negative match with the hash of comparison block 550 as computed by hash function 512, and that the comparison block is not a duplicate data block.

On the other hand, if the hash of comparison block 550 as computed by hash function 512 is found to be present in Bloom filter 522, then it is likely that the comparison block has been previously processed by SDXI device 500. However, it will be understood that there is a small probability that non-duplicate data may result in a common hash result from the data of comparison block 550 as computed by hash function 512. That is, Bloom filter 522 is statistically capable of determining that comparison block 550 is definitely not a duplicate block or that the comparison block is highly likely to be a duplicate block, but is not capable of determining that the comparison block is definitely a duplicate block. This is because the odds of two different sets of data being processed by a particular hash algorithm and deriving a common hash value is exceedingly small, but are not exactly zero. Here, when hash function 512 derives a hash value for comparison block 550 that is found in Bloom filter 522, the Bloom filter provides a "HIT" indication to accelerator block 530, indicating that the was a potentially matching data block that was previously processed by SDXI device 500. Bloom filter 522 further operates to provide a location, such as an address, for the previously processed data block, e.g., data block 552, to accelerator block 530.

Accelerator block 530 represents a data comparison block, and operates to fetch previously processed block 552, as identified by bloom filter 522, and to directly compare the contents of the previously processed data block with comparison block 550 to determine if the contents of both blocks are identical. If not, data comparison block 530 provides a "MISS" indication indicating that comparison block 550 and previously processed block 552 are not duplicates. On the other hand, if the contents of previously processed block 552 and comparison block 550 are identical, then data comparison block 530 provides a "HIT" indication that indicates that comparison block 550 and previously processed block 552 are identical. It will be understood that the use of two or more hash functions, such as hash functions 512, 514, and 516, will provide greater certainty as to whether or not comparison block 550 was previously, processed by SDXI device 500. Moreover, where Bloom filter 522 identifies more than one matching hash value that are each associated with a different previously processed block, e.g., data blocks 554 and 556, data comparison block 530 may operate to compare each of the previously processed blocks with comparison block 550 to determine definitively whether or not the comparison block is a duplicate block.

Cache memory device 540 represents a memory device configured to store one or more of comparison blocks 552, 554, and 556, as needed or desired. In particular, cache memory device 540 is configured to store data blocks that frequently experience HITs from bloom filter 522, to reduce the necessity to access a storage device within which the data blocks are stored. In this way, SDXI device 500 can operate more quickly to identify duplicate blocks. Cache memory device 540 will be understood to operate in accordance with a particular cache algorithm to maximize the utility of the data blocks stored therein. An example of the cache algorithm may include a least recently used (LRU) algorithm, a first-in/first-out (FIFO) algorithm, a last-in/last-out (LIFO) algorithm, or another cache algorithm, as needed or desired. Caching is known in the art, and the methods and algorithms for caching will not be further described herein, except as needed to illustrate the current embodiments.

It will be understood that not all data blocks in a storage device may be represented by hash values that are stored in Bloom filter 522. For example, Bloom filter 522 is limited as to the number of data block hash values that can be stored therein. Here, Bloom filter 522 may operate in accordance with a particular hash eviction algorithm, similar to a cache algorithm, in order to ensure that the most commonly duplicated data blocks are more frequently represented in the Bloom filter. In a particular embodiment, accelerator block 520 accounts for cases where not all data blocks in a storage device are represented by hash values that are stored in Bloom filter 522, and the "MISS" indication from accelerator block 520 is not combined with the "MISS" indication from data comparison block 530. Rather, the "MISS" indication from accelerator block 520 is understood to indicate that comparison block 550 is not a duplicate to any data blocks that are represented in Bloom filter 522, but may still be a duplicate of one or more data blocks that are stored on the storage device, and the "MISS" indication from accelerator block 520 is utilized to initiate other data deduplication functions as needed or desired.

Figure 6:
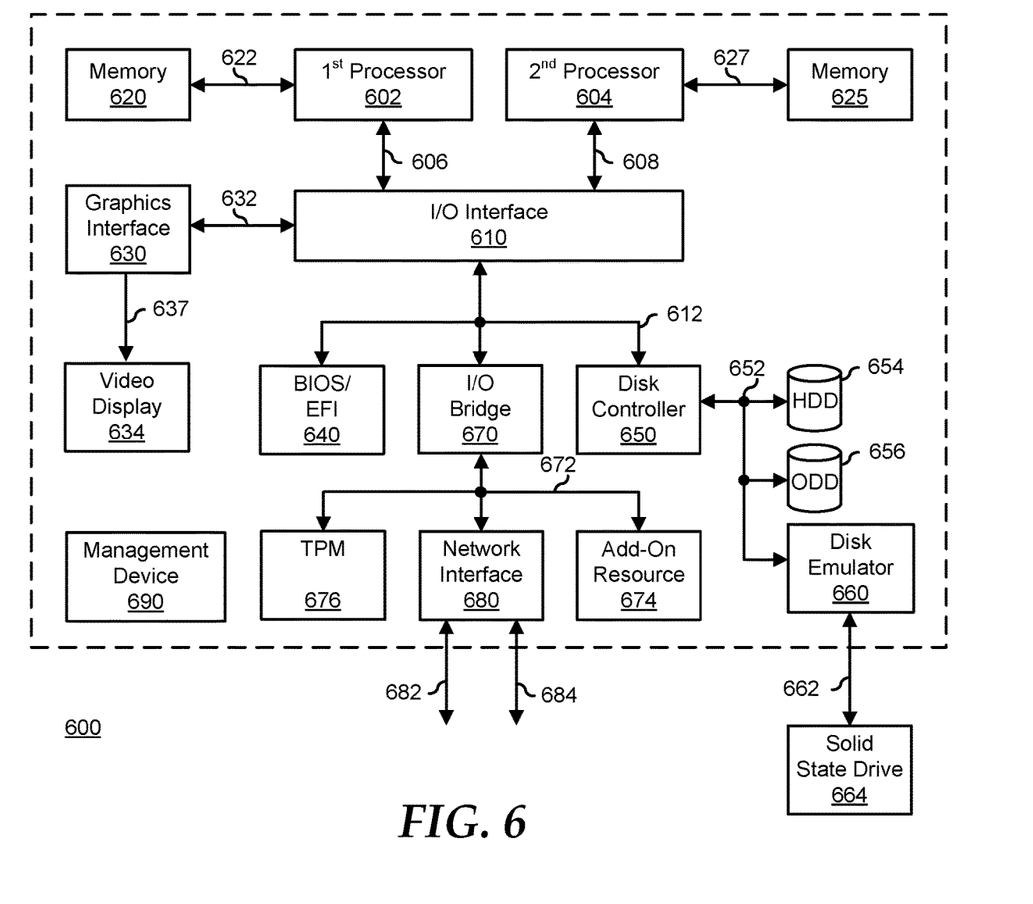
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A hardware accelerator device to detect duplicate data blocks independently from a processor of an information handling system, the hardware accelerator device comprising:
    an interface configured to receive a data block and at least one of a plurality of comparison data blocks;
    a hash function accelerator configured to determine a first hash of the received data block;
    a bloom filter accelerator including a plurality of comparison hashes, wherein each comparison data block is associated with at least one comparison hash, and wherein the bloom filter accelerator is configured to determine whether the first hash matches a first comparison hash, wherein the first comparison hash is associated with a first comparison data block;
    a data comparison accelerator configured, in response to the determination that the first hash matches the first comparison hash, to receive the first comparison data block via the interface, and to compare the received data block with the first comparison data block to determine whether the received data block and the first comparison data block are identical; and
    a cache memory block, wherein, in receiving the first comparison data block, the interface is further configured to store the first comparison data blocks to the cache memory device;
    wherein, when the data comparison block determines that the received data block and the first comparison data block are identical, the hardware accelerator device is configured to store a first pointer that associates the received data block with the first comparison data block, without storing the received data block.

2. The hardware accelerator device of claim 1, wherein, when the data comparison block determines that the received data block and the first comparison data block are not identical, the hardware accelerator device is configured to store the first hash in the bloom filter accelerator, and to direct the interface to store the received data block.

3. The hardware accelerator device of claim 1, wherein:
    the bloom filter accelerator is further configured to determine whether or not the first hash matches a second comparison hash, wherein the second comparison hash is associated with a second comparison data block;
    the data comparison block is further configured, in response to the determination that the first hash matches the second comparison hash, to receive the second comparison data block via the interface, and to compare the received data block with the second comparison data block to determine whether or not the received data block and the second comparison data block are identical; and when the data comparison block determines that the received data block and the second comparison data block are identical, the hardware accelerator device is configured to store a second pointer that associates the received data block with the second comparison data block, without storing the received data block.

4. The hardware accelerator device of claim 1, wherein:
the bloom filter accelerator is further configured to determine that the first hash does not match any of the comparison hashes; and
wherein, when the first hash does not match any of the comparison hashes, the hardware accelerator device is configured to store the first hash in the bloom filter accelerator, and to direct the interface to store the received data block.

5. The hardware accelerator device of claim 1, wherein:
the hash function accelerator is further configured to determine a second hash of the received data block;
the bloom filter accelerator is further configured to determine whether or not the second hash matches a second comparison hash, wherein the second comparison hash is associated with a second comparison data block; and
the data comparison block is further configured, in response to the determination that the second hash matches the second comparison hash, to receive the second comparison data block, via the interface and to compare the received data block with the second comparison data block to determine whether or not the received data block and the second comparison data block are identical.

6. The hardware accelerator device of claim 5, wherein in determining the first hash, the hash function accelerator is configured to utilize a first hash function, and, in determining the second hash, the hash function accelerator is configured to utilize a second hash function different from the first hash function.

7. The hardware accelerator device of claim 5, wherein, in receiving the second comparison data block, the interface is further configured to store the first and second comparison data block to the cache memory device.

8. The hardware accelerator device of claim 7, wherein the cache memory device is further configured to evict the first comparison data block when the interface stores the second comparison data block in accordance with a cache algorithm.

9. The hardware accelerator device of claim 1, wherein the interface is a Smart Data Accelerator Interface (SDXI) interface.

10. A method to detect duplicate data blocks independently from a processor of an information handling system, the method comprising:
receiving, by an interface of a hardware accelerator device, a data block and at least one of a plurality of comparison data blocks;
determining, by a hash function accelerator of the hardware accelerator device, a first hash of the received data block;
determining, by a bloom filter accelerator of the hardware accelerator device, whether the first hash matches a first comparison hash, wherein the first comparison hash is associated with a first comparison data block of a plurality of comparison data blocks, wherein the bloom filter accelerator includes a plurality of comparison hashes, and wherein each comparison data block is associated with at least one comparison hash;
receiving, by a data comparison accelerator of the hardware accelerator device, the first comparison data block via the interface in response to determining that the first hash matches the first comparison hash;
comparing, by the data comparison accelerator, the received data block with the first comparison data block to determine whether the received data block and the first comparison data block are identical;
storing a first pointer that associates the received data block with the first comparison data block, without storing the received data block when the data comparison block determines that the received data block and the first comparison data block are identical; and
storing, by the interface, the first comparison data block to a cache memory device of the hardware accelerator device.

11. The method of claim 10, further comprising:
storing the first hash in the bloom filter accelerator when the received data block and the first comparison data block are not identical; and
directing the interface to store the received data block.

12. The method of claim 10, further comprising:
determining whether or not the first hash matches a second comparison hash, wherein the second comparison hash is associated with a second comparison data block;
receiving the second comparison data block in response to determining that the first hash matches the second comparison hash;
comparing the received data block with the second comparison data block to determine whether or not the received data block and the second comparison data block are identical; and
storing a second pointer that associates the received data block with the second comparison data block without storing the received data block when the received data block and the second comparison data block are identical.

13. The method of claim 10, further comprising:
determining that the first hash does not match any of the comparison hashes;
storing the first hash in the bloom filter accelerator when the first hash does not match any of the comparison hashes; and
directing the interface to store the received data block.

14. The method of claim 10, further comprising:
determining a second hash of the received data block;
determining whether or not the second hash matches a second comparison hash, wherein the second comparison hash is associated with a second comparison data block;
receiving receive the second comparison data block in response to determining that the second hash matches the second comparison hash; and
comparing the received data block with the second comparison data block to determine whether or not the received data block and the second comparison data block are identical.

15. The method of claim 14, wherein in determining the first hash, the hash function accelerator is configured to utilize a first hash function, and, in determining the second hash, the hash function accelerator is configured to utilize a second hash function different from the first hash function.

16. The method of claim 14, further comprising:
storing, by the interface, the second comparison data block to the cache memory device.

17. The method of claim 16, further comprising:
evicting, by the cache memory device, the first comparison data block when the interface stores the second comparison block in accordance with a cache algorithm.

18. The method of claim 10, wherein the interface is a Smart Data Accelerator Interface (SDXI) interface.

19. An information handling system, comprising:
a processor; and
a hardware accelerator device to detect duplicate data blocks independently from the processor, the hardware accelerator device including:
  an interface configured to receive a data block and at least one of a plurality of comparison data blocks;
  a hash function accelerator configured to determine a first hash of the received data block;
  a bloom filter accelerator including a plurality of comparison hashes, wherein each comparison data block is associated with at least one comparison hash, and wherein the bloom filter accelerator is configured to determine whether the first hash matches a first comparison hash, wherein the first comparison hash is associated with a first comparison data block;
  a data comparison accelerator configured, in response to the determination that the first hash matches the first comparison hash, to receive the first comparison data block via the interface, and to compare the received data block with the first comparison data block to determine whether the received data block and the first comparison data block are identical; and
  a cache memory block, wherein, in receiving the first comparison data block, the interface is further configured to store the first comparison data blocks to the cache memory device;
  wherein, when the data comparison block determines that the received data block and the first comparison data block are identical, the hardware accelerator device is configured to store a first pointer that associates the received data block with the first comparison data block, without storing the received data block.

20. The information handling system of claim 19, wherein, when the data comparison block determines that the received data block and the first comparison data block are not identical, the hardware accelerator device is configured to store the first hash in the bloom filter accelerator, and to direct the interface to store the received data block.

\* \* \* \* \*